United States Patent [19]

Teufel

[11] Patent Number: 4,473,390

[45] Date of Patent: Sep. 25, 1984

[54] SOIL PRODUCT

[76] Inventor: George R. Teufel, 770 SW. Viewmont Dr., Portland, Oreg. 97225

[21] Appl. No.: 451,342

[22] Filed: Dec. 20, 1982

Related U.S. Application Data

[63] Continuation-in-part of Ser. No. 240,754, Mar. 5, 1981, abandoned.

[51] Int. Cl.³ .............................................. C05F 11/00
[52] U.S. Cl. .......................................... 71/23; 71/28; 71/64.13; 71/903
[58] Field of Search ................... 71/64.13, 11, 21, 23, 71/903, 904, 28

[56] References Cited

U.S. PATENT DOCUMENTS 1,882,377 10/1932 Whittelsey ...................... 71/903 X
3,269,824 8/1966 Aswell ............................... 71/25 X
3,876,411 4/1975 Fowler .............................. 71/904 X

FOREIGN PATENT DOCUMENTS 2843928 4/1980 Fed. Rep. of Germany ........ 71/903

Primary Examiner—Ferris H. Lander
Attorney, Agent, or Firm—Eugene M. Eckelman

[57] ABSTRACT

The product and method for forming the invention utilizes a base material of straw. The straw is coated with a water insoluble material which provides a slow decomposition when subjected to moisture and microbial action and which also in some cases can provide a release of nutrient as it decomposes. After applying the coating, the product is formed into compressed units for curing and then is ground into particles to provide a soil-like texture for use as a potting soil or for nursery beds.

3 Claims, 1 Drawing Figure

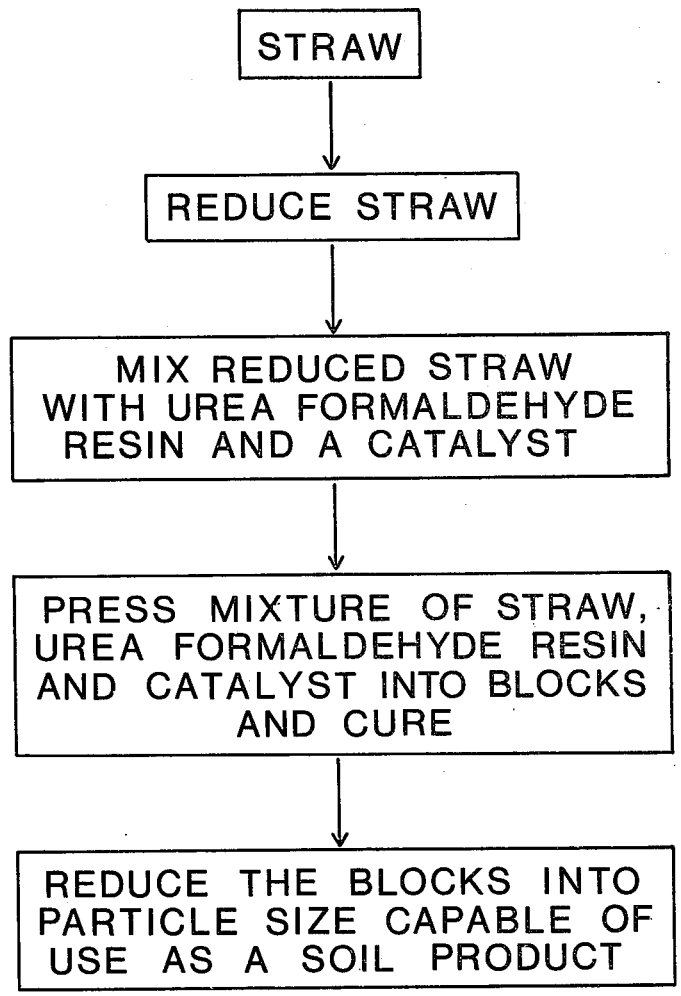

SOIL PRODUCT

REFERENCE TO PRIOR APPLICATIONS

This application is a continuation-in-part of application Ser. No. 240,754, filed Mar. 5, 1981 for Soil Product and now abandoned.

BACKGROUND OF THE INVENTION

This invention relates to an improved soil product and methods of making the same.

Various types of soil mixtures are used commercially and for retail such as for potted plants, nursery beds, etc. These mixtures include a minimum of actual soil since good natural soil is difficult to obtain and has other disadvantages such as for example it is heavy to handle, it has poor moisture retention qualities, etc. One mixture that is popularly used as a soil additive or conditioner is barkdust since it has good moisture retention qualities and it decomposes at a slow rate. However, barkdust is now being used extensively in other products, such as structural board, adhesive, etc., and the demand thereof has made it too expensive for mass usage as a soil conditioner. Straw has been used as a soil conditioner and has some attractive features, namely, it is abundant and inexpensive and also makes a good mulch when decomposed. Straw, however, has the disadvantage that it decomposes at a fast rate and thus is not feasible for commercial use. Artificial soil mixtures have also been used but such mixtures are too expensive at least for commercial use.

SUMMARY OF THE INVENTION

According to the present invention and forming a primary objective thereof, a soil product is provided which is inexpensive to manufacture, which uses a base material that is abundant and economical, which is light in weight and thus easy to handle, store and ship, which has desired moisture retention qualities, and which decomposes at a relatively slow rate.

In the formation of such a product, a base material of straw is used. Such straw is coated with a water insoluble material providing slow decomposition of the straw. After applying the coating, it is preferred that the coated product be formed into compressed units for handling and storage and subsequently ground into particles to provide a soil-like texture for use as a potting soil or nursery bed soil.

The invention will be better understood and additional objects and advantages will become apparent from the following description taken in connection with the drawing.

BRIEF DESCRIPTION OF THE DRAWING

The drawing comprises a flow diagram of one embodiment of the invention.

DETAILED DESCRIPTION OF PREFERRED EMBODIMENTS

In brief, the product and a preferred manner of forming the same comprises first reducing a straw to shorter lengths than that which it is supplied from the fields, for example, to lengths of about ¼ inch to 4 inches. The straw used can be almost any type, such as for example, wheat straw, oat straw, grass straw, rice straw, or others, and its reduction to the shorter lengths can be by any suitable machine or method. A conventional hammer mill will provide the desired reduction, the output screen thereof being pre-selected in size to provide the desired reduction of the straw. A hammer mill is very effective since it not only reduces the length of the straw stems but it also breaks up some of the tubular structure of the straw for maximum coverage by a water insoluble material as will now be described.

Examples of a water insoluble material to accomplish the invention comprise urea formaldehyde resin, phenol formaldehyde resin, and poly vinyl acetate. It is to be understood that other water insoluble solutions may serve the same purpose. The resin is mixed with the straw by any conventional means such as by an auger mixer. The mixing step is accomplished in a short time such as from 1 to 2 minutes, more or less, and thoroughly coats the straw surfaces with the resin. Even the interior surfaces of the straw pieces that remain tubular after reduction thereof is coated.

The mixture is then formed into blocks, slabs, or sheets. Preferably these blocks or similar enlarged units are formed under pressure, such as from 200 to 1500 psi. The shape and size of the compressed units are not important, although it is desired that they be of a shape and size which make them easy to handle, store, and ship. A John Deere hay cuber works efficiently in the formation of these compressed units. If the straw is not thoroughly coated with resin after the mixing step, thorough coating is insured by the pressured formation of the compressed units. Such units are allowed to cure into solid form and when thusly cured have a density of approximately 15 to 60 pounds per cubic foot. A suitable catalyst if necessary is used with the resin, the rate of curing depending upon the ratio of catalyst used. Heat may be applied in this step to speed up the cure, but such is not necessary.

After the compressed units are cured into a solid form, they are reduced to a usable particle soil-like size, such as from 1/16 inch to ¾ inch, or of course any other size that may suit a particular use as a potting soil or a bedding soil. A conventional hammer mill is readily adaptable to provide the desired reduction. The product can be stored in the compressed unit form and ground into the soil-like particle form as needed.

The soil product of the invention may be used alone or in combination with other material such as natural soil and has many advantages in its use as a potting soil or bedding soil mixture. A first advantage of the straw base material is that straw is very abundant in supply and inexpensive to purchase. Also, by the combination of straw and resin, there is an advantage that since the resin coats the entire surface of the straw particles and since it also causes the mixture to be water insoluble, the coating protects the straw from decomposition, at least for a time. Although the mixture is substantially water insoluble, moisture and microbial action from the soil or atmosphere will cause decomposition to occur, such being, however, at a relatively slow rate. The product thus will have some water retention qualities from the beginning and such retention qualities increase as decomposition progresses.

The decomposition process will have a span at least as long as a growing season for most plants.

The soil product of the invention is thus inexpensive to manufacture in view of the abundant supply and the small cost of straw. The product is light in weight and easy to handle either in its final particle form or in its compressed unit form prior to final grinding. The compressed form allows it to be easily handled for movement and storage and if kept dry it can be stored for long periods of time. The product when used for plant growth retains sufficient moisture for good root growth. It can be used strictly as a soil itself or can be mixed with natural soil or other material to serve as a conditioner or mulch.

EXAMPLE I

A supply of oat straw was reduced in a hammer mill and passed through a screen which reduced the straw to lengths of from ¼ inch to 3 inches in length. The ratio of ingredients was 90% by weight of reduced straw to 10% by weight of urea formaldehyde resin. The straw and resin were mixed for about 2 minutes and then formed into blocks at about 200 psi and allowed to cure. After hardening of the mixture, it was reduced in a hammer mill to a particle size of from 1/16 inch to ¾ inch in diameter.

EXAMPLE II

A supply of wheat straw was reduced in a hammer mill and passed through a screen which reduced the straw to lengths of from ½ inch to 4 inches in length. The ingredients comprised 80% by weight of the straw to 20% by weight of phenol formaldehyde resin. The straw and resin were mixed for one minute and then formed into sheets at about 1500 psi and allowed to cure. After hardening of the mixture, it was reduced in a hammer mill to a particle size averaging ⅛ inch in diameter.

EXAMPLE III

A supply of grass straw was reduced in a hammer mill and passed through a screen which reduced the straw to lengths of from ¼inch to 1 inch in length. The ingredients comprised 75% by weight of the straw to 25% by weight of poly vinyl acetate. The straw and resin were mixed for three minutes and then formed into slabs at about 500 psi and allowed to cure. After hardening of the mixture, it was reduced in a hammer mill to a particle size averaging 1/16 inch in diameter.

The exact initial size and size of reduction of the compressed straw in the above examples may vary from the examples given. Also, the proportions of resin to straw may vary as well as proportions within the resins themselves, the different proportions only serving to vary the extent of insolubility and the rate of decomposition. By using a strong catalyst to change the pH of the resin, the compressed units can be cured in a very short time. Although mixing of the resin with the straw under atmospheric pressure is preferred, it is to be understood that such may be accomplished at elevated pressures. It is also to be understood that the amount of pressure for forming the compressed units may vary from the examples given.

When urea formaldehyde resin is used as the one ingredient, it adds another advantage to the invention, namely, as the urea formaldehyde molecules break down, the urea releases nitrogen as a nutrient. Thus, with the use of this particular resin, a fertilizer is provided as well. The rate of decomposition and consequent release of nitrogen will increase with a raise in temperature and thus more nitrogen is released during the time that the plants are the most active. Since the amount of straw per weight greatly exceeds the amount of resin per weight, the manufacturing cost of the product is maintained at a minimum amount.

Having thus described my invention, I claim:

1. The method of making a straw based soil product comprising reducing straw to lengths of from about ¼ inch to 4 inches, mixing the straw with a water insoluble material comprising urea formaldehyde resin and a catalyst to coat said straw, compressing and curing said mixture into solid form to distribute the coating of said insoluble material evenly on substantially all surfaces of the straw, and then reducing said solid form into particles ranging in size from about 1/16 inch to ¾ inch for use as a soil product having a decomposition rate slower than untreated straw when subjected to moisture and microbial action.

2. The method of claim 1 wherein the ratio of ingredients is in the range of 75% to 90% by weight of straw and 10% to 25% of said water insoluble material.

3. The method of claim 1 wherein the pressure applied for compressing the reduced straw is in the range of from 200 psi to 1500 psi.

* * * * *